May 26, 1959 W. F. FANNING 2,888,022
SHOCK ABSORBER FOR ORTHOPEDIC CRUTCHES
Filed Nov. 30, 1956
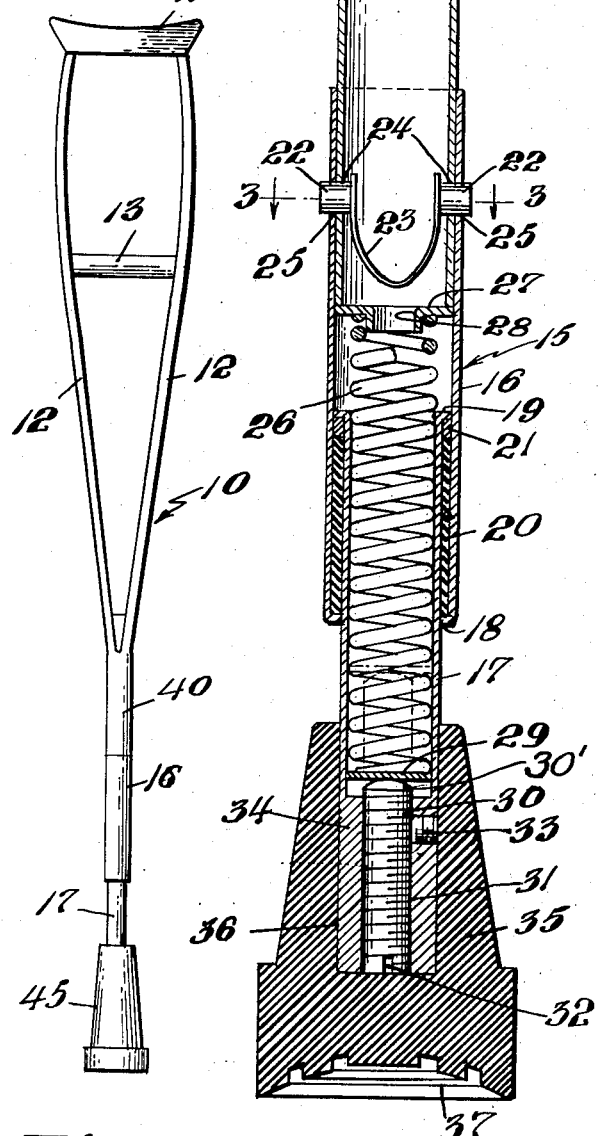
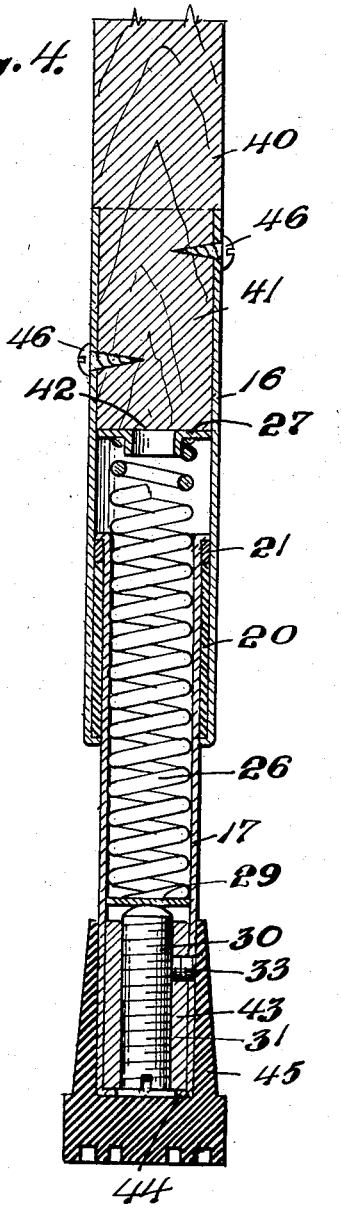
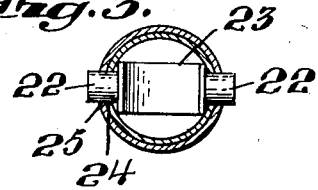
INVENTOR.
Walter F. Fanning
BY
Barlow & Barlow
ATTORNEYS.

2,888,022
SHOCK ABSORBER FOR ORTHOPEDIC CRUTCHES

Walter F. Fanning, Mystic, Conn.

Application November 30, 1956, Serial No. 625,539

2 Claims. (Cl. 135—60)

This invention relates to a crutch for the physically handicapped, particularly a crutch in which there is some resiliency as the weight of the body is applied thereto.

To accomplish this, I have provided a so-called shock absorber which as a unit can be easily affixed to any metal or wooden type crutch. It can also be made as an integral part of the crutch.

A crutch designed with resiliency for cushioning the weight of the body as applied necessitates the use of a shock absorber in which there are moving parts that wear after lengthy service. Lubrication of the wearing parts must be taken care of, and it is desirable that any noise be eliminated as much as possible. It is also desirable that there be a means of adjustment in the shock absorber when the crutches are used by persons of different weight to give them the same comfort in their use.

One of the objects of this invention is to provide a structure in which the wear due to the working of one part on another will be minimized.

Another object of the invention is to provide self-lubrication of the parts to prolong the life of the absorber.

Another object of the invention is to provide a spring for a cushion action and an adjustment for the spring for different body weights.

Another object of the invention is to provide for the centralizing of the spring so that it may better operate.

And another object of the invention is to design a shock absorber that is applicable to any type of metal or wooden crutch and will adopt any of the standard rubber tips used on the regular standard type crutches to eliminate noise on contact.

Another object of the invention is to increase the wearing life of the standard rubber tip on the ground engaging end of the crutch.

A more specific object of the invention is to provide for relative rotation between the ground engaging end of the crutch and the body engaging end so that relative rotation of the body engaging end will not be transmitted to the ground engaging end.

With these and other objects in view, the invention consists of certain novel features of construction as will be more fully described and particularly pointed out in the appended claims.

In the accompanying drawings:

Figure 1 is an elevation of a crutch equipped with this invention;

Figure 2 is a sectional fragmental view of the lower portion of a tubular type crutch;

Figure 3 is a sectional view on line 3—3 of Figure 2; and

Figure 4 is a view similar to Figure 2 but showing a modified form of a wooden type crutch.

In proceeding with this invention, I have provided a unit which may be attached to the lower end of the usual crutch. The attachment has two relatively rotatable telescoping sections with a spring acting between these sections for providing a cushion with an adjustment for the spring which is operable through the bottom of the lower telescoping section, which adjustment will not be altered by the rotation of the sections. The resilient tip of the crutch covers the open end of the section through which the adjustment occurs, thus preventing water and dirt from entering. I have also provided self-lubrication of the sliding sections and have centralized the spring so that it may always act in an axial direction.

With reference to the drawings, 10 designates generally a crutch having a shoulder engaging portion 11 with bifurcated arms 12 and a hand grip 13. The lower portion 14 of the crutch which, in the showing in Figure 2 is metal, is tubular to which the sections pertaining to this invention designated generally 15 are detachably connected.

This invention comprises the upper and outer tubular section 16 and the lower inner tubular section 17 which telescopes into the section 16 and is spaced therefrom. The outer section 16 has an inwardly turned flange 18 at its lower end which is turned in sufficiently to be closely adjacent the outer surface of the walls of the inner section 17.

This inner section 17 is flanged outwardly at its upper end 19 so that the edge of this flange is closely adjacent to the inner surface of the outer section. These flanges provide a space between the sections 16 and 17 along their telescoping portions in which there is located bushing 20 of oil impregnated material such as bronze, carbon or nylon. By reason of this oil impregnated bushing 20, good lubrication is provided along the long sliding surface of the portion of the tubular section 17 which moves in the tubular section 16. At the upper end of bushing 20 is a ring 21 of non-metallic material such as neoprene, nylon, leather or fiber which acts as a silencer ring against which the flange 19 may strike.

A spring 26 is used for urging the sections apart, and this spring is within the telescoping sections and centralized with relation to the axis thereof. The upper end of the spring engages an abutment member 27 which is essentially a washer of a size to engage the end of the lower portion 14 of the crutch and has a central portion 28 drawn from this washer so as to extend into the center of the helical spring 26. The other end of the spring engages an abutment member 29 which may be moved axially of the section 17 by a headless screw 30 threaded into the threaded bore 31 which extends inwardly from the lower end of this section 17, access being had to the slot 32 of the screw through the end of the section 17. A set screw 33 through the wall 34 of the section engages the screw 30 and holds the same in adjusted position. By means of a screw driver engaging and turning the screw 30, the pressure on the spring may be varied to accommodate different weight persons who may be using the crutch. The end 30' of the screw is convex shaped to give a point contact on the flat surface of the member 29 so that turning the adjusting screw or rotating sections 16 and 17 in opposite direction will not disturb the setting of the spring 26.

A cuplike tip 35 of rubber or synthetic rubber having a recess 36 elastically engages the lower portion of the section 17 and serves to eliminate all outside contact noises and to keep foreign matter from entering the threaded bore 31. The end of the tip is concaved as at 37 to give a better gripping surface.

The above described shock absorber may be an integral part of a crutch; but as I have here shown, it may constitute a complete unit to be attached to an existing rigid crutch. To attach to a metal crutch such as shown in Figure 2, the section 16 is held to the lower portion 14 of the crutch by pins 22 that are attached to a leaf spring 23 which forces the same outwardly through the registering openings 24 in the lower portion 14 of the crutch end 25 in the section 16. For detaching the sections from the lower portion 14, it is merely necessary to press inwardly on these two pins and withdraw the section 16 from its position.

In some cases, the crutch may be made of wood as at 40 in Figure 4, and in this case, the section 16 slides over the reduced portion 41 of the wooden crutch and is held thereon by wood screws 46 and the abutment member 27 engages the end 42 of this reduced portion of the crutch.

In the showing of Figure 4 the threaded bore 31 is located in a sleeve 43 inserted in the section 17 rather than the section wall being thickened as shown in Figure 2; and in this case, the lower end of the section 17 is flanged inwardly as at 44 to hold this sleeve in position. The screw 30 with a slotted end 32 will be adjusted, however, in the same fashion. The crutch tip 45 having a different bottom surface and smaller than tip 35 may also be used as well as many other standard type tips.

As the crutch is placed in advance of the body and the body is swung forward on the crutch the upper part of the crutch will be rotated transmitting this rotation to the section 16. However the section 26 which carries the rubber tip 45 being rotatable in section 16 will not be rotated and consequently the tip will not be rotated on the ground thus increasing its wearing life. Further the screw 31 will also not rotate in the threaded bushing 34 due to its convex end 30' there being insufficient friction to turn it.

I claim:

1. An attachment for the lower end of a crutch having means to engage the arm of the user comprising two telescoping tubular sections rotatably related to each other, the outer end of one section having means to engage the lower end of the crutch and the outer end of the other section having means for engaging the ground, a spring urging said sections apart, an abutment member slidable in said other section provided with a surface of substantial area with one side of which one end of the spring engages with sufficient friction to cause rotation of said member when relative rotation of the sections occurs, the other side of said member being provided with a flat surface, an adjusting screw in the said other section having a convex rounded end engaging said flat surface in substantially reduced contact therewith to axially move said member relative to said section and adjust the tension of the spring whereby rotary friction is reduced so that rotating the tubular sections relatively will not disturb the setting of the spring and will reduce wear on the means for engaging the ground.

2. An attachment for the lower end of a crutch having means to engage the arm of the user comprising two telescoping tubular sections rotatably related to each other, the outer end of one section having means to engage the lower end of the crutch and the outer end of the other section having means for engaging the ground, a spring urging said sections apart, an abutment member provided with a surface of substantial area slidable in said other section with one side of which one end of the spring engages with sufficient friction to cause rotation of said member when relative rotation of the sections occurs, the other side of said member being provided with a flat surface, an adjusting screw in the said other section having a convex rounded end engaging said flat surface in substantially reduced contact therewith to axially move said member relative to said section and adjust the tension of the spring whereby rotary friction is reduced so that rotating the tubular sections relatively will not disturb the setting of the spring and will reduce wear on the means for engaging the ground and a set screw having the longitudinal axis at right angles to the longitudinal axis of the adjusting screw to engage and hold the latter in adjusted position.

References Cited in the file of this patent

UNITED STATES PATENTS

| | | |
|---|---|---|
| 332,684 | Tuttle | Dec. 15, 1885 |
| 1,076,689 | McKinney | Oct. 28, 1913 |
| 1,557,923 | Carroll | Oct. 20, 1925 |
| 1,753,065 | Payne | Apr. 1, 1930 |
| 2,073,149 | Geyer | Mar. 9, 1937 |
| 2,347,524 | Swann | Apr. 25, 1944 |
| 2,856,943 | Sparlin | Oct. 21, 1958 |

FOREIGN PATENTS

| | | |
|---|---|---|
| 196,117 | Great Britain | Apr. 19, 1923 |
| 371,291 | France | Jan. 18, 1907 |

UNITED STATES PATENT OFFICE
CERTIFICATE OF CORRECTION

Patent No. 2,888,022

May 26, 1959

Walter F. Fanning

It is hereby certified that error appears in the above numbered patent requiring correction and that the said Letters Patent should read as corrected below.

In the grant, line 3, address of inventor, for "Mystic, Connecticut" read -- Westerly, Rhode Island --; in the heading to the printed specification, line 3, for "Mystic, Conn." read -- Westerly, R. I. --.

Signed and sealed this 8th day of September 1959.

(SEAL)
Attest:

KARL H. AXLINE
Attesting Officer

ROBERT C. WATSON
Commissioner of Patents